(12) United States Patent
Nieto Avila et al.

(10) Patent No.: US 10,584,521 B2
(45) Date of Patent: Mar. 10, 2020

(54) MECHANISM TO OPEN HOOD

(71) Applicant: FORD GLOBAL TECHOLOGIES, LLC, Dearborn, MI (US)

(72) Inventors: Berenice Nieto Avila, Mexico City (MX); Ricardo Jimenez, Mexico City (MX); Ricardo Sanchez, Texcoco (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 800 days.

(21) Appl. No.: 15/258,420

(22) Filed: Sep. 7, 2016

(65) Prior Publication Data
US 2018/0066461 A1    Mar. 8, 2018

(51) Int. Cl.
*B62D 25/12*    (2006.01)
*E05B 79/22*    (2014.01)
(Continued)

(52) U.S. Cl.
CPC .............. *E05B 83/24* (2013.01); *B62D 25/12* (2013.01); *E05B 85/10* (2013.01); *E05B 79/22* (2013.01)

(58) Field of Classification Search
CPC .......... E05B 83/24; E05B 85/10; E05B 79/22; B62D 25/12
See application file for complete search history.

(56) References Cited

U.S. PATENT DOCUMENTS 741,888 A * 10/1903 Binks ..................... A01D 34/14
56/3
3,397,906 A    8/1968 Beckman et al.
(Continued)

FOREIGN PATENT DOCUMENTS

EP    0 604 055 A2    6/1994
KR    482685    4/2005
(Continued)

OTHER PUBLICATIONS

Penn State College, "Secondary Hood Release Handle," www.if.psu.edu/Projects/?pid=297 (Spring 2011).

*Primary Examiner* — Carlos Lugo
*Assistant Examiner* — Thomas L Neubauer
(74) *Attorney, Agent, or Firm* — David Coppiellie; Price Heneveld LLP (57) ABSTRACT

A motor vehicle secondary hood latch release mechanism for a hood comprises a striker disposed on the hood, a secondary hood latch having an externally actuated release pawl, the secondary hood latch urged to a first position in engagement with the striker and a second position disengaged from the striker, and a longitudinally actuated release push button assembly, the push button assembly comprising a push button having a forward position and a rearward position, a guide along which the push button moves between the forward position and the rearward position, and a longitudinally extending actuator operatively coupled with the push button, wherein the longitudinally extending actuator comprises an inclined cam surface that engages and displaces the externally actuated release pawl of the secondary hood latch from the first position to the second position as the push button is moved from the forward position to the rearward position.

20 Claims, 7 Drawing Sheets

(51) Int. Cl.
    *E05B 83/24*    (2014.01)
    *E05B 85/10*    (2014.01)

(56) References Cited

U.S. PATENT DOCUMENTS

| | | | |
|---|---|---|---|
| 3,966,244 A | | 6/1976 | Kleisser et al. |
| 4,382,482 A | | 5/1983 | Brandl et al. |
| 4,991,884 A | | 2/1991 | Cairns |
| 5,000,493 A | | 3/1991 | Bastien |
| 5,853,060 A | | 12/1998 | Chao et al. |
| 6,109,670 A | * | 8/2000 | Tomaszewski ......... E05B 83/24 |
| | | | 292/216 |
| 6,666,483 B2 | | 12/2003 | Baniak et al. |
| 7,204,526 B2 | | 4/2007 | Seo |
| 7,530,609 B2 | | 5/2009 | Beauchamp et al. |
| 9,366,061 B2 | * | 6/2016 | Kwon ................... E05B 85/107 |
| 9,725,074 B2 | * | 8/2017 | Huebner ................... B60S 1/50 |
| 9,752,356 B2 | * | 9/2017 | Tamaki ................... E05B 83/30 |
| 9,784,020 B2 | * | 10/2017 | Kwon ..................... E05B 83/24 |
| 2006/0170224 A1 | * | 8/2006 | Mitchell ................ E05B 83/24 |
| | | | 292/216 |
| 2013/0221685 A1 | | 8/2013 | Polewarczyk et al. |
| 2014/0210220 A1 | * | 7/2014 | Limberg ................ E05B 83/24 |
| | | | 292/216 |
| 2015/0191943 A1 | | 7/2015 | Tieman |

FOREIGN PATENT DOCUMENTS

| | | |
|---|---|---|
| KR | 100575175 | 5/2006 |
| WO | 2004 052674 | 6/2004 |
| WO | 2006 081367 | 8/2006 |
| WO | 2015 088461 | 6/2015 |

\* cited by examiner

MECHANISM TO OPEN HOOD

FIELD OF THE INVENTION

The present disclosure generally relates to a mechanism by which to open the hood of a motor vehicle and, in particular, a push button mechanism accessible from the exterior of the motor vehicle by which to open the hood that employs a spring loaded actuator that is pushed inwardly to temporarily displace a secondary hood latch to a disengaged and released position relative a hood striker to allow the hood to be opened.

BACKGROUND OF THE INVENTION

Latch assemblies for motor vehicles are generally well-known in the art. In most motor vehicles, a hood is used to enclose the engine or luggage compartment of the motor vehicle. Such hoods are typically situated so as to be opened from the front of the vehicle and hinged along a rearward edge, such that the hood opens from the front of the vehicle. The hood is typically equipped with one or more strikers attached to the lower surface near the forward edge of the hood. The striker is situated to interact and to be restrained by the latch assembly attached to the motor vehicle chassis, likewise located proximate the forward edge of the hood. A latch release handle is often situated in the occupant compartment, typically near the driver's side kick panel or under the instrument panel. The handle may be connected via a Bowden cable to a latch release lever operatively connected to a primary hood latch of the latch assembly. Upon actuation of the hood release handle in the occupant compartment, the Bowden cable pulls on the latch release lever, thereby releasing the striker from the primary hood latch of the latch assembly. At this point, a spring assembly may be used to urge the hood upwardly to a partially open position at a pre-determined height, typically about 50-75 mm (or about 2-3 inches), and is held to this position by a secondary hood latch.

Such secondary hood latches are provided to mitigate inadvertent release of the primary hood latch handle or failure of the primary hood latch while the vehicle is in motion, which may cause the hood to abruptly rise due to wind pressure. Rather, the secondary hood latch requires an operator standing in front of the vehicle to manually operate the secondary hood latch to free the hood striker from the secondary hood latch of the latch assembly, thereby allowing the hood to be fully raised, providing access to the engine within the engine compartment and/or luggage within the luggage compartment.

Thus, in the context of latch assemblies having primary and secondary hood latches, after the operator pulls the primary hood latch release lever from inside the passenger compartment, the hood is released from engagement with the primary hood latch and moved to a secondary hood latch release position. The operator then must move to the front of the vehicle in close proximity to the hood, where the operator must then search for and locate a secondary hood latch release handle by inserting his or her fingers under the partially opened hood and then actuate the handle left or right (or up or down, depending the vehicle design) to release the secondary hood latch. The hood can then be fully opened, either manually or through some other assist mechanism, such as gas cylinders or torsion springs.

The location of the secondary hood latch release handle varies significantly from vehicle to vehicle. Particularly to an operator unfamiliar with the motor vehicle he or she may be operating, the secondary hood latch release handle can be frustratingly difficult to locate by touch alone. It is often difficult to see through the narrow, partial opening of the hood, particularly in poorly lit areas or at night. Hence, a latch assembly which overcomes these drawbacks would be advantageous.

The hood latch disclosed herein particularly accomplishes the foregoing by adapting the present typical motor vehicle hood latch assembly described above through the use of a secondary hood latch having a locking hook at a first distal end disposed to selectively engage the striker and an externally actuated release pawl disposed at an opposite second distal end of the secondary hood latch. A longitudinally extending actuator operatively coupled with a push button assembly provides a rearwardly facing inclined cam surface that selectively engages the release pawl of the secondary hood latch to move the secondary hood latch to a release position when a push button to displaced rearwardly within the push button assemble, thereby allowing the operator to fully raise the hood.

Thus, the solution presented by the present disclosure obviates the need for the operator to insert his or her fingers under the partially opened hood to actuate and release the secondary hood latch, providing for convenient and confident actuation of the secondary hood latch release handle.

SUMMARY OF THE INVENTION

According to one aspect of the present disclosure, a motor vehicle secondary hood latch release mechanism for a hood comprises a striker disposed on a forward lower surface of the hood, a secondary hood latch having an externally actuated release pawl, the secondary hood latch urged to a first position in engagement with the striker and having a second position disengaged from the striker, and a longitudinally actuated release push button assembly, the push button assembly comprising a push button having a forward position and a rearward position, a guide along which the push button moves between the forward position and the rearward position, and a longitudinally extending actuator operatively coupled with the push button, wherein the longitudinally extending actuator comprises an inclined cam surface that engages and displaces the externally actuated release pawl to actuate the secondary hood latch from the first position to the second position as the push button is moved from the forward position to the rearward position.

According to a further aspect of the present disclosure, a hood latch release mechanism comprises a striker disposed on a hood, a secondary hood latch, a displaceable push button, and an actuator operatively coupled with the push button, where the actuator has an inclined cam surface that engages a release pawl operably coupled with the secondary hood latch to disengage the secondary hood latch from the striker as the push button is moved from a forward position to a rearward position.

According to another aspect of the present disclosure, a motor vehicle secondary hood latch release mechanism for a hood has a striker disposed on a forward lower surface of the hood, and a secondary hood latch having a release pawl, the secondary hood latch having a first position in engagement with the striker and a second position disengaged from the striker. A longitudinally actuated release push button assembly has a push button having a forward position and a rearward position and a pair of tabs on opposite sides thereof. A guide along which the push button moves between the forward position and the rearward position includes a tubular member within which a pair of longitudinally extending slots formed within the inner surface of the tubular member each engage one of the pair of tabs on the push button, the guide further comprising a rear stop and a front stop beyond which the push button is prevented from traveling. A longitudinally extending actuator is operatively coupled with the push button, wherein the longitudinally extending actuator comprises an inclined cam surface that engages and displaces the release pawl of the secondary hood latch from the first position to the second position as the push button is moved from the forward position to the rearward position. A resilient member urging the push button to the forward position.

These and other aspects, objects, and features of the present disclosure will be understood and appreciated by those skilled in the art upon studying the following specification, claims, and appended drawings.

DETAILED DESCRIPTION OF THE EMBODIMENTS

As referenced in the figures, the same reference numerals may be used herein to refer to the same parameters and components or their similar modifications and alternatives.

Figure 1:
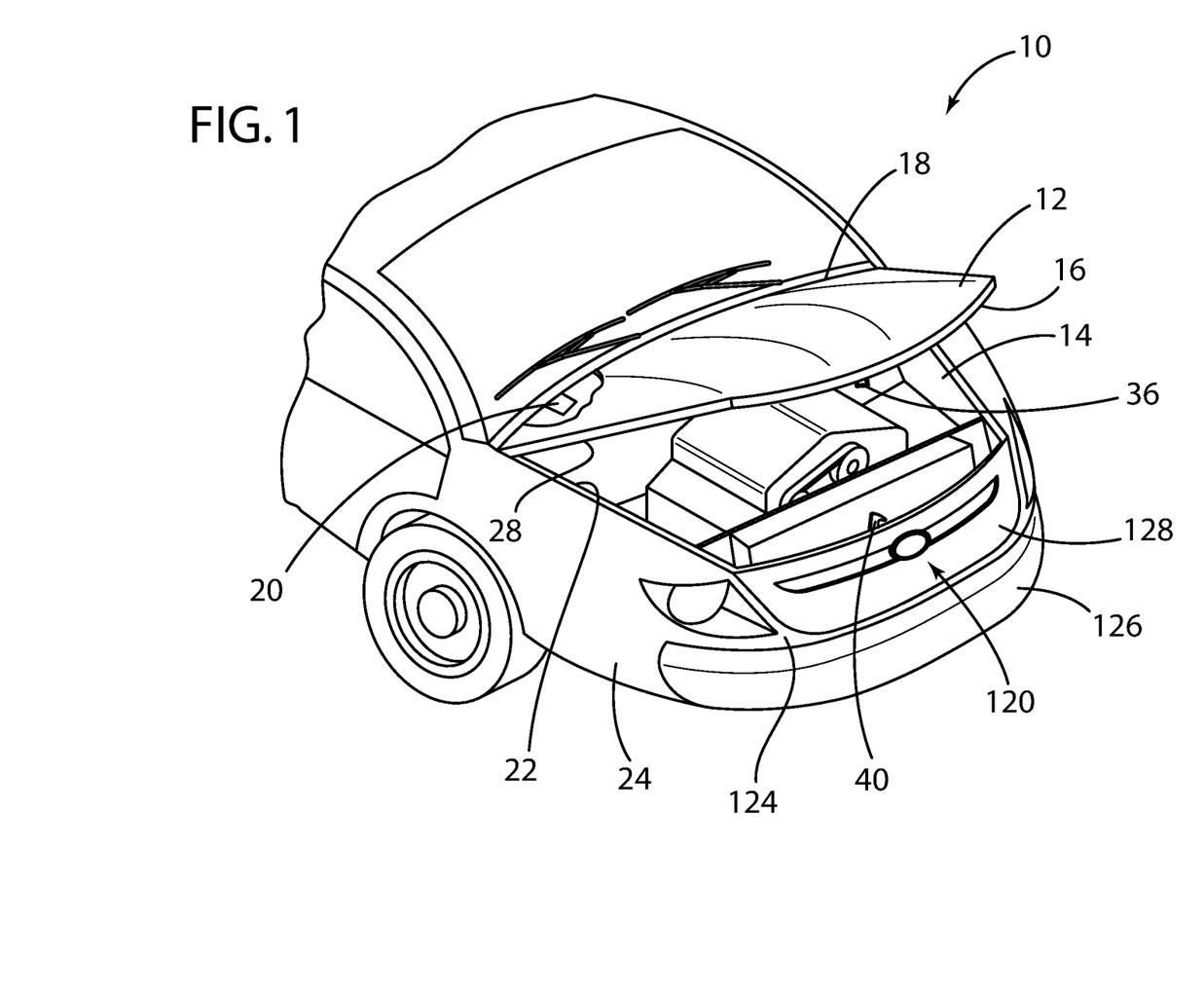
FIG. 1 is a front perspective view of a motor vehicle provided with the improved hood latch release mechanism of the present disclosure.

For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Motor vehicle 10 includes a hood 12 covering an engine compartment 14. Hood 12 is generally formed as a panel having a forward edge 16 and a rearward edge 18. The rearward edge of the hood 12 may be connected to the body of the motor vehicle 10 by hinges 20. In the closed position, hood 12 is disposed adjacent and extends across an opening 22 in the body 24 of motor vehicle 10, providing access to an engine compartment 14. Hood 12 has an upper surface 26 and a lower surface 28 and is releasably connected to the motor vehicle 10 by a hood latch assembly 30 and is pivotable relative to the motor vehicle 10 to move between an open position and a closed position. In the described embodiment, hood latch assembly 30 is located adjacent the forward edge 16 of the hood on a front chassis member 31 and the hinges 20 may be located at the rearward edge 18 of hood 12.

Referring now to FIGS. 2-5, the hood latch assembly 30 is shown in detail. The hood latch assembly 30 includes a hood latch bracket 32 attached via mounting holes 34 to the front chassis member 31 via fasteners (not shown) extending transverse parallel to the lateral axis of the motor vehicle, as is well-known in the art. The hood latch assembly 30 interacts with a striker 36 disposed on the forward edge 16 of the hood 12 relative to the motor vehicle 10. The hood 12 has a closed locked position, a released position, and an open position. In the closed locked position, the hood 12 cannot be raised and is restrained in place by a primary hood latch 38 capturing and restraining the striker 36. A secondary hood latch 40 is also provided and is pivotally attached via a pivot mount 42 to the hood latch bracket 32 so as to also capture and restrain the striker 36 in the event that the primary hood latch 38 is released.

Figure 3:
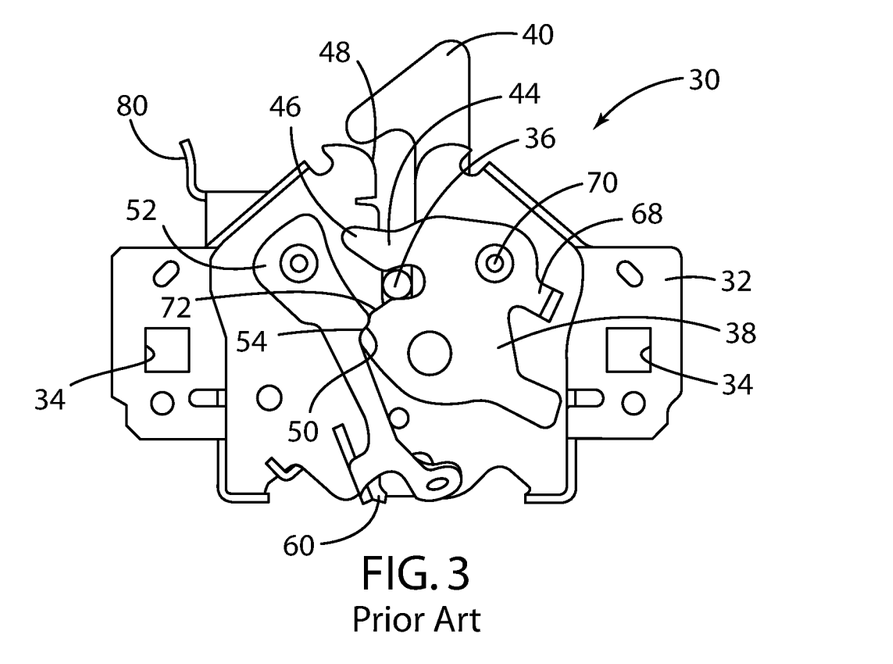
FIG. 3 is a another rear plan view of a hood latch release mechanism of the prior art.
Figure 4:
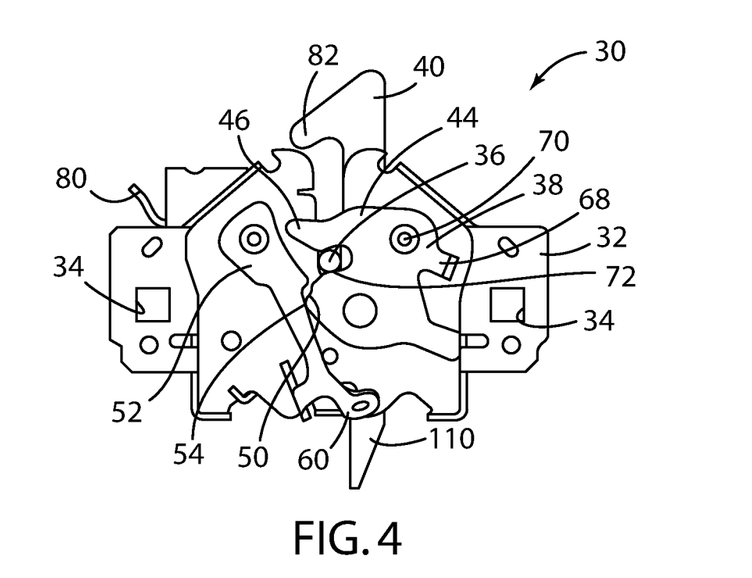
FIG. 4 is a rear plan view of the improved hood latch release mechanism of the present disclosure with the primary hood latch engaged.
Figure 5:
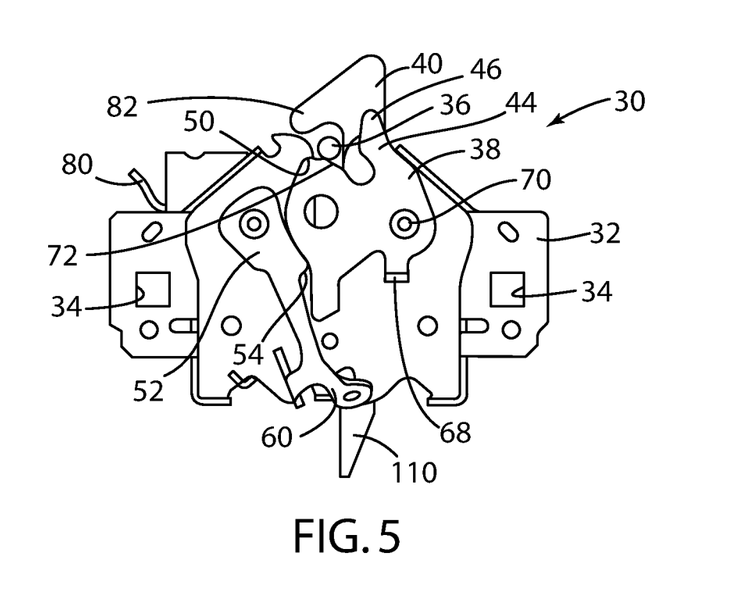
FIG. 5 is a rear plan view of the improved hood latch release mechanism of the present disclosure with the primary hood latch disengaged.
Figure 6:
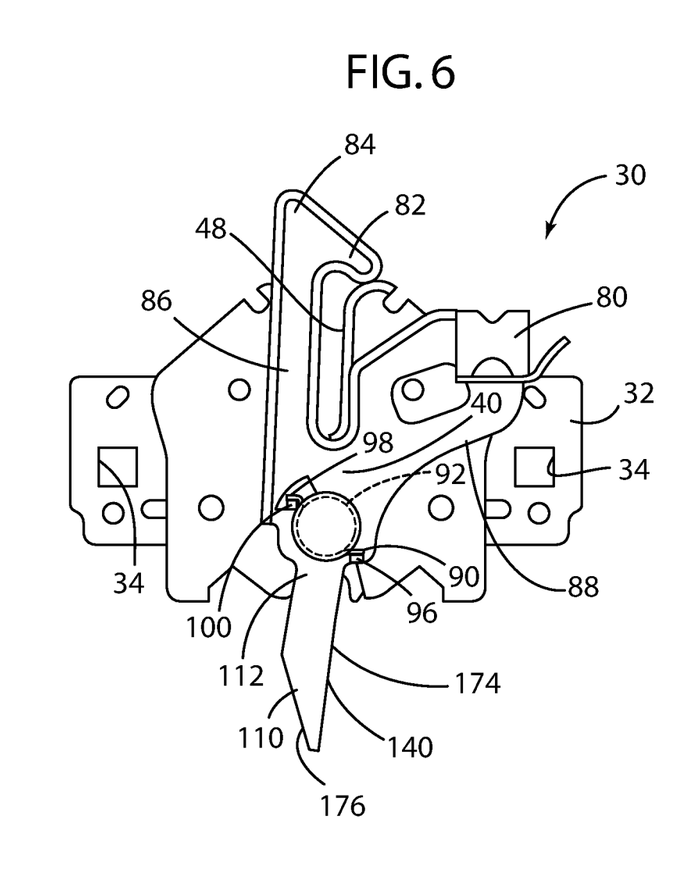
FIG. 6 is a front plan view of the improved hood latch release mechanism of the present disclosure with a first embodiment of the secondary hood latch engaged.
Figure 7:
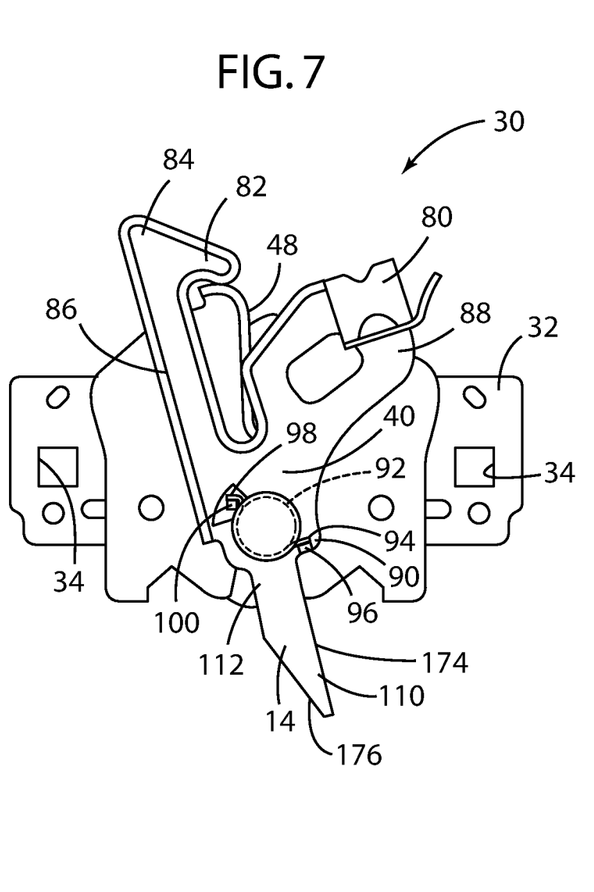
FIG. 7 is a front plan view of the improved hood latch release mechanism of the present disclosure with the first embodiment of the secondary hood latch disengaged.

As shown in the FIGS. 3-5, the primary hood latch 38 rotates around a latch pivot bolt 70 between an engaged position and a disengaged position. In the embodiment shown, the primary hood latch 38 is provided with an upper latch leg 44 that includes a transverse portion 46 that extends upwardly and away from a channel 48 provided in the hood latch bracket 32 for engaging and capturing the striker 36 of the hood 12.

Figure 2:
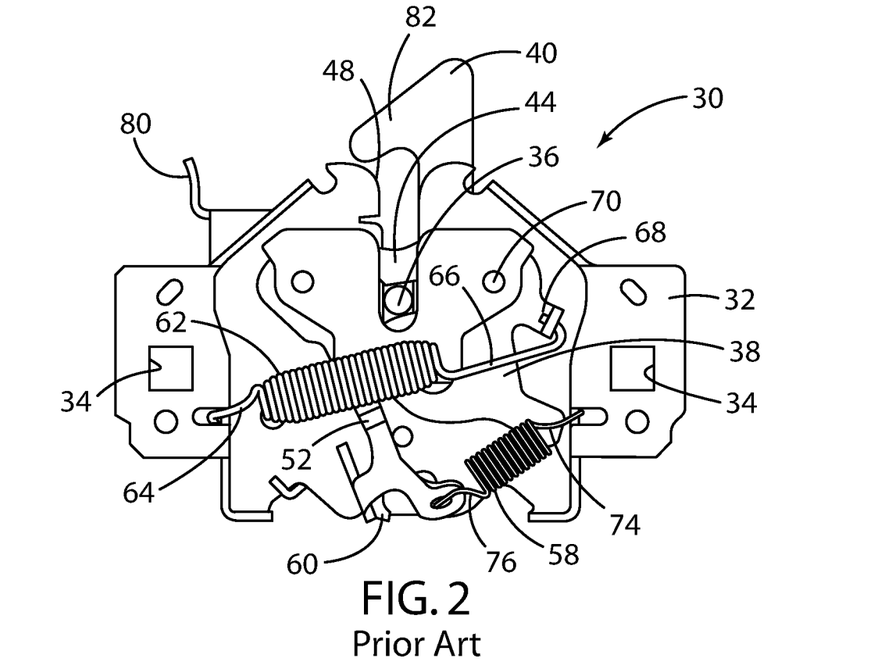
FIG. 2 is a rear plan view of a hood latch release mechanism of the prior art.

As best shown in FIGS. 2 and 3, the primary hood latch 38 is provided with a single pawl engaging tab 50 for engaging a latch cam engaging surface 54 of a pawl 52 of the hood latch assembly 30. The distal end 60 of pawl 52 is connected to a Bowden cable (not shown) and the latch cam engaging surface 54 of the pawl 52 is urged into contact with the pawl engaging tab 50 by a pawl spring 58 acting on pawl 52 to rotate the pawl 52 counterclockwise and by primary hood latch spring 62 acting on primary hood latch 38 to rotate the primary hood latch 38 clockwise, as best seen in FIG. 2. As shown, pawl spring 58 has a first end 74 attached to the hood latch bracket 32 and an opposite second end 76 attached to the distal end 160 of the pawl 52. Primary hood latch spring 62 likewise has a first end 64 attached to the hood latch bracket 32 and an opposite second end 66 attached to a latch spring mounting ear 68 provided on the primary hood latch 38.

In operation, the motor vehicle operator releases a primary hood latch release lever from inside of passenger compartment the motor vehicle (not shown), which pulls on the Bowden cable. Actuation of the Bowden cable pulls on the distal end 60 of the pawl 52 and thereby causes the pawl 52 to rotate, against the force of pawl spring 58, in a clockwise direction to release the pawl engaging tab 50 of the primary hood latch 38 from the latch cam engaging surface 54 of the pawl 52, as shown in FIG. 5. With the primary hood latch 38 now free to rotate under the urging of the primary hood latch spring 62, an arcuate bottom surface 72 of the primary hood latch 38 urges the striker 36 upwardly within the channel 48. Optionally, a vertically oriented spring assembly (not shown) may be disposed beneath a forward portion of the lower surface of the hood, or torsion springs (not shown) coupled with the hinges 20, or gas pistons (not shown) may be used to further urge the hood 12 to a slightly open position.

As the striker 36 reaches the upper portion of the channel 48 and is essentially free of the primary hood latch 38, the striker 36 engages the secondary hood latch 40, which is normally held in the latched position, thereby allowing the hood 12 to be partially raised, typically about 50-75 mm (or about 2-3 inches). The vehicle operator must then go to the front of the motor vehicle 10 and, in accordance with the prior art, manually operate a secondary hood latch handle 80 to rotate the secondary hood latch 40 and thereby free the striker 36 from the secondary hood latch 40 to allow the hood 12 to be raised.

The secondary hood latch 40 may be configured with a locking hook 82 at a first distal end 84 of an upwardly extending arm 86 disposed to engage the striker 36 and the secondary hood latch handle 80 integrated into an integrated metal member 88, preferably fabricated from stamped steel. Thus, the upwardly extending arm 86 of the secondary hood latch 40 and the secondary hood latch handle 80 form a generally U-shaped configuration with the pivot mounted 42 disposed mounted at a bottom portion 90 thereof. The pivot mount 42 is used to pivotally attach the bottom portion 90 of the integrated metal member 88 to the hood latch bracket 32. The secondary hood latch 40 is urged to a first position in engagement with the striker 36 by a torsion spring 92 disposed about the pivot mounted 42. Preferably, the torsion spring 92 has a first leg 94 acting against a spring tab 96 mounted on the integrated metal member 88 of the secondary hood latch 40 and a second leg 98 acting against a spring tab 100 mounted on the hood latch bracket 32. The secondary hood latch 40 must be manually actuated by the vehicle operator against the force of the torsion spring 92 to a second position that is disengaged from the striker 36 in order to release the hood 12.

Figure 8:
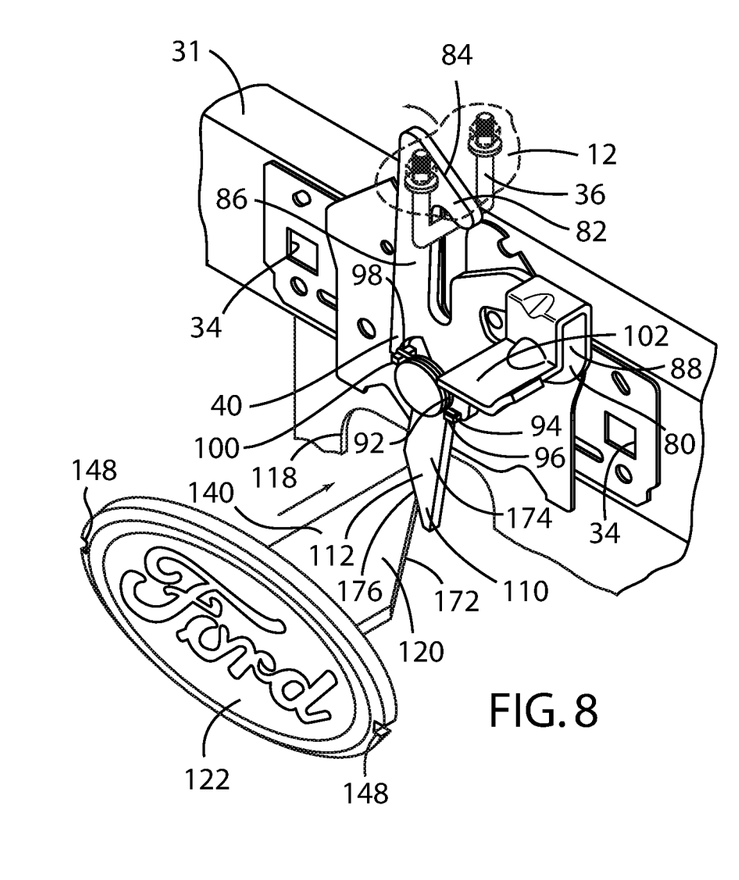
FIG. 8 is a front perspective of the improved hood latch release mechanism of the present disclosure with the first embodiment of the secondary hood latch engaged.
Figure 9:
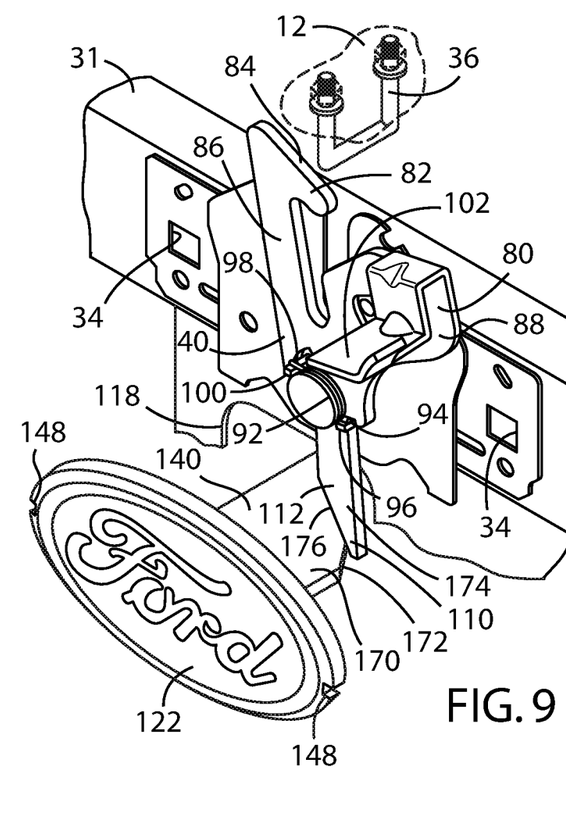
FIG. 9 is a front perspective of the improved hood latch release mechanism of the present disclosure with the first embodiment of the secondary hood latch disengaged.

As best shown in FIGS. 8 and 9, the secondary hood latch handle 80 may also include a forwardly extending and cantilevered metal lever 102, preferably encased in a plastic material, by which the motor vehicle operator may rotate the secondary hood latch 40 out of engagement with the striker 36. That is, with the hood 12 in the slightly open position, there thus exists enough room for the motor vehicle operator to insert a hand under the hood 12, after the primary hood latch 38 is released, in order to release the secondary hood latch 40 by manipulating the secondary hood latch handle 80 to the left (in the embodiment shown in FIGS. 8 and 9, which may vary with vehicle design) to manually rotate the secondary hood latch 40 from an engaged position with the striker 36 to a disengaged position relative the striker 36. Upon doing so, the striker 36 is free to rise upwardly within the channel 48 and the hood latch assembly 30 to thereby allow the hood 12 to be fully opened, whereupon the motor vehicle operator can have full access to the engine compartment 14 situated beneath the hood 12.

However, as noted above, the foregoing description requires the motor vehicle operator to insert a hand under the hood 12 to release the striker 36. Particularly in low light circumstances, this may be difficult and may result in injury to the motor vehicle operator's hand if not done correctly. Further, in the event that the motor vehicle operator is unfamiliar with the motor vehicle 10, for example, as in a rental car, the operator of the motor vehicle may have to fumble about in order to properly manipulate the secondary hood latch handle 80 to disengage a secondary hood latch 40.

Figure 10:
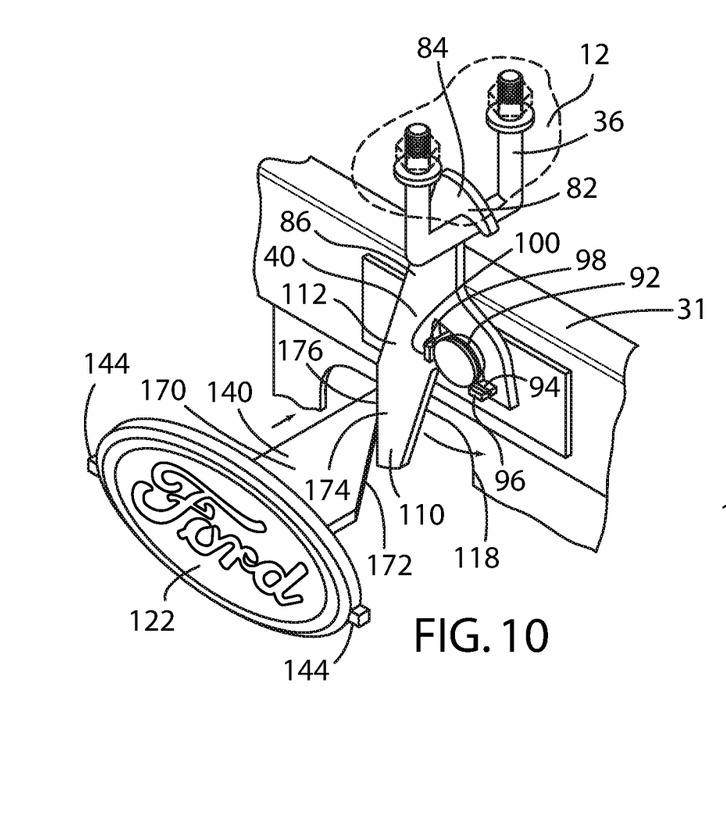
FIG. 10 is a front perspective of the improved hood latch release mechanism of the present disclosure with a second embodiment of the secondary hood latch engaged.
Figure 11:
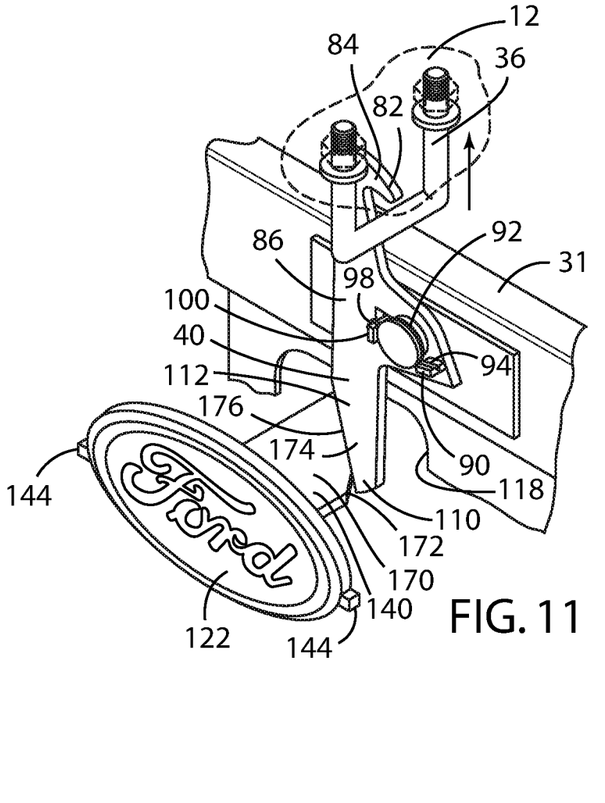
FIG. 11 is a front perspective of the improved hood latch release mechanism of the present disclosure with a second embodiment of the secondary hood latch disengaged.

The improvement of the present disclosure relates to the use of an innovative secondary hood latch release mechanism 40. As noted above, the secondary hood latch 40 has a locking hook 82 at a first distal end 84 disposed of the vertically extending arm 86 to engage the striker 36 when in the first position and a pivot mount 42 by which secondary hood latch 40 is pivotally attached to the front chassis member 31 of the motor vehicle 10 and about which the secondary hood latch 40 pivots. Preferably, an externally actuated release pawl 110 is integrated with the secondary hood latch 40 and is disposed at an opposite second distal end 112 of the secondary hood latch 40, as further discussed herein below. The externally actuated release pawl 110 may be optionally added to pre-existing secondary hood latch 40 configurations, as a first embodiment, as shown in FIGS. 8 and 9, and thereby retain the conventional secondary hood latch handle 80 having a forwardly extending and cantilevered metal lever 102 to actuate the secondary hood latch release 40 and thereby raise the hood. Alternatively, as shown in another embodiment presented in FIGS. 10 and 11, the secondary hood latch handle 80 can be omitted.

As can be seen in FIGS. 1 and 8-14, in accordance with the present disclosure, an additional and improved secondary hood latch release mechanism comprises a longitudinally actuated release push button assembly 120. The longitudinally actuated release push button assembly 120 comprises a push button 122 having a first forward position and a second rearward position, a guide 130 along which the push button 122 moves between the first forward position and the second rearward position, and a longitudinally extending actuator 140 operatively coupled with the push button 122.

The longitudinally actuated release push button assembly 120 is preferably disposed on a front surface 124 of the motor vehicle 10, proximate the hood latch assembly 30, so that it can be used to actuate the secondary hood latch 40 as described herein and is accessible from the exterior of the motor vehicle 10. It may be disposed on a fascia assembly 126 mounted to the forward portion of the motor vehicle 10 or it may be disposed on a grill assembly 128 mounted to the forward portion of the motor vehicle 10, as shown in FIG. 1. Even more preferably, the push button 122 is configured to incorporate a motor vehicle logo on a front surface 124 of the motor vehicle 10.

Figures 13, 14:
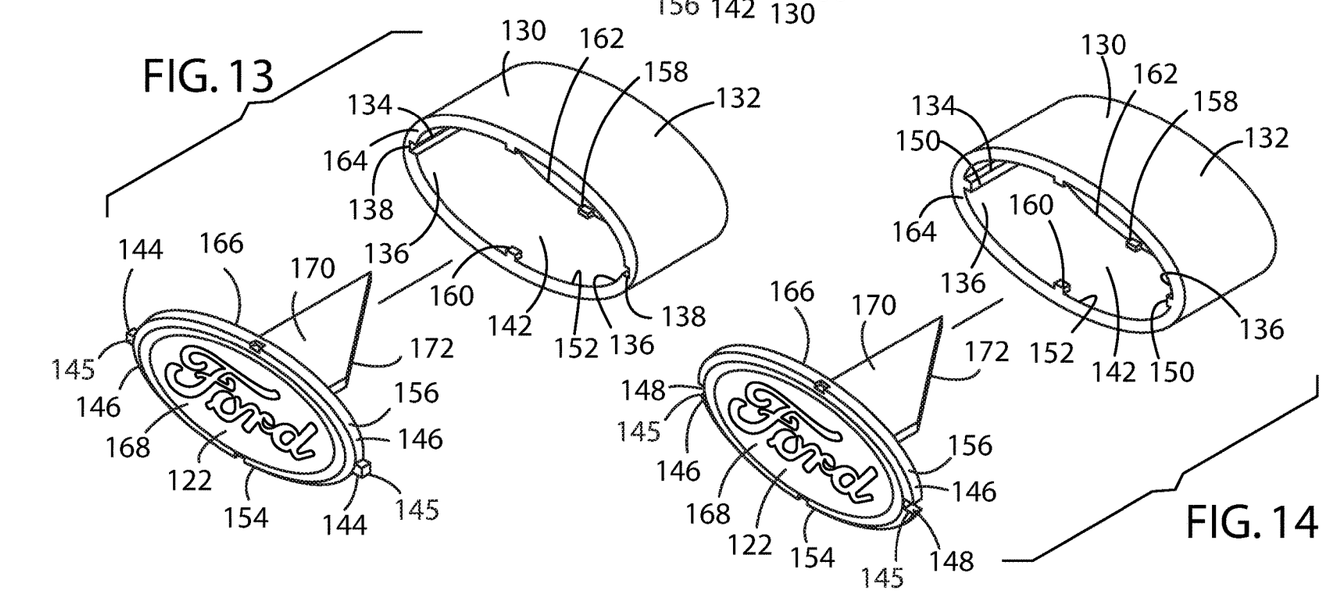
FIG. 13 is a front perspective view of the first embodiment of the push button assembly of the improved hood latch release mechanism of the present disclosure.
FIG. 14 is a front perspective view of a second embodiment of the push button assembly of the improved hood latch release mechanism of the present disclosure.

The guide 130 of the longitudinally actuated release push button assembly 120 preferably includes a tubular member 132 within which a pair of guide rails 134 is disposed upon opposite sides 136 on an inner surface thereof, as shown in FIG. 13. Preferably, the tubular member 132 forms an oval-shaped tube within which the push button 122 may be displaced, wherein the axis of the oval-shaped tube is substantially parallel with the longitudinal axis of the motor vehicle 10. The guide rails 134 preferably comprise longitudinally extending slots 138 formed within the interior surface 142 of the tubular member 132. The push button 122, in turn, is provided with a pair of outwardly extending tabs 144 on opposite sides 146 thereof that form rail engaging members 145 that each engages one of the slots 138. Alternatively, the push button 122 may be provided with one of a pair of notches 148 disposed on either side 146 proximate an outer perimeter 154 thereof is the rail engaging members 45 and one of a pair of elongated and inwardly extending tabs 150 can be provided on opposite sides 136 of the interior surface 142 of the tubular member 132 as the rail guides 134 that engages one of the pair of notches 148.

The inner perimeter 152 defined by the interior surface 142 of the tubular member 132 of the guide 130 is preferably sized along the axial length of the tubular member 132 to slidably receive the outer perimeter 154 of the push button 122. That is, there should be sufficient clearance between the outer perimeter 154 of the push button 122 and the inner perimeter 152 of the tubular member 132 so that the push button 122 may be moved between the forward position and the rearward position within the length of the tubular member 132 without any significant interference. Further, it is preferred that a small rearwardly facing skirt 156 be provided about the outer perimeter 154 of the push button 122 so as to prevent tilting of the push button 122 within the tubular member 132 as it is displaced fore and aft. In addition, one or more rear stops 158 may be provided on the interior surface 142 of the tubular member 132 proximate a rear edge 162 thereof to limit the rearward motion of the push button 122. Similarly, one or more front stops 160 may be provided on the interior surface 142 of the tubular member 132 proximate a front edge 164 thereof to prevent the push button 122 from moving beyond the front edge 164 of the tubular member 132. Thus, the push button 122 is thus restrained within the tubular member 132 between the forward position and the rearward position.

The longitudinally extending actuator 140 of the push button assembly 120 preferably extends perpendicularly from a rear face 166 of the push button 122. As noted above, the front face 168 of the push button 122 preferably carries a logo or some other identifying indicia. The longitudinally extending actuator 140 is formed from a rearwardly extending member 170 having a rearwardly facing inclined cam surface 172. In turn, the externally actuated release pawl 110 of the secondary hood latch 40 further comprises a downwardly extending lever 174 having a cam engaging surface 176 upon which the inclined cam surface 172 of the longitudinally extending actuator 140 bears to rotate the secondary hood latch 40 counterclockwise from the first position engaged with the striker 36 to the second position disengaged from the striker 36. Thus, as the push button 122 is pushed rearwardly from the forward position to the rearward position, the push button 122 actuates the secondary hood latch 40. Preferably, a recess 118 is provided in the front chassis member 31 in order to provide clearance for the downwardly extending lever 174 as it is rotated.

The motor vehicle secondary hood latch release mechanism also preferably utilizes a resilient member urging the push button 122 to the forward position. As noted above, the secondary hood latch 40 is preferably urged to the first position in engagement with the striker 36 by the torsion spring 92, and must be manually actuated by the motor vehicle operator against the force of the torsion spring 92 to a second position that is disengaged from the striker 36. Preferably, the torsion spring 92 mounted about the pivot mounted 42 rotatably coupling the secondary hood latch 40 to the hood latch bracket 32 so as to urge the secondary hood latch 40 to the first position serves as the resilient member resilient member. The externally actuated release pawl 110 of the secondary hood latch 40 is thereby urged in a clockwise direction and in turn the cam engaging surface 176 bears against the inclined cam surface 172 of the longitudinally extending actuator 140 to urge the push button 122 to the forward position.

Figure 12:
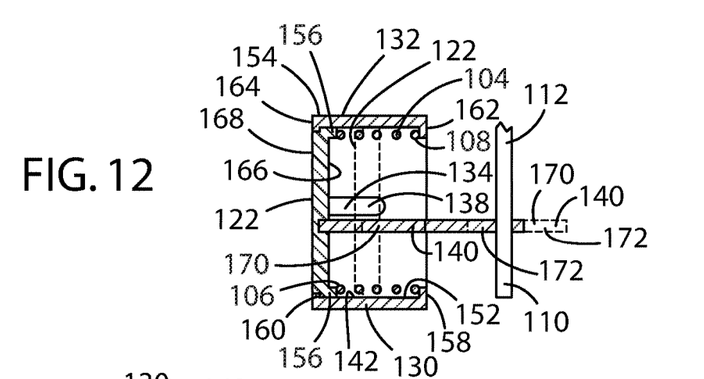
FIG. 12 is a side cross sectional view of a first embodiment of the push button assembly of the improved hood latch release mechanism of the present disclosure.

Alternatively, as shown in FIG. 12, the resilient member may comprise a separate compression spring 104 incorporated between the tubular member 132 of the guide 130 and the push button 122 to urge the push button 122 to the forward position. The compression spring 104 has a first end 106 seated against the rear face 166 of the push button 122 and a second end 108 seated against the rear stops 158.

To operate the motor vehicle latch assembly in accordance with the present disclosure, the motor vehicle operator again releases the primary hood latch release lever from inside of passenger compartment the motor vehicle 10 to release the primary hood latch 38 from the striker 36 attached to the lower surface 28 of the hood 12. The primary release latch 38 then rotates under the urging the primary hood latch spring 62 and the arcuate bottom surface 72 of the primary release latch 38 urges the striker 36 upwardly within the channel 48.

The motor vehicle operator then exits the motor vehicle and moves to the front of the motor vehicle 10. However, in this instance, there is no requirement that the motor vehicle operator insert a hand under the hood 12 after the primary hood latch 38 is released in order to release the secondary hood latch 40. Rather, it is only necessary that the motor vehicle operator push the push button 122 located on the front surface 124 of the motor vehicle inward, toward the rear of the vehicle, which in turn will manually rotate the secondary hood latch 40 from an engaged position with the striker 36 to a disengaged position relative the striker 36. Upon doing so, the striker 36 is free to rise upwardly from the hood latch assembly 30 and thereby allow the hood 12 to be fully opened.

As noted above, the push button 122 can be incorporated in a logo situated in the front of the motor vehicle 10. This feature allows the push button assembly 120 to be effectively camouflaged with the styling of the motor vehicle 10, providing an aesthetically pleasing configuration. A further advantageous feature of the present disclosure is that it is not necessarily a replacement for current hood latch release mechanisms. Rather, it can be incorporated into existing latch assemblies as an additional feature. The present disclosure merely provides a more convenient actuator that may be added to existing hood latch release mechanisms in order to manipulate the secondary hood latch 40 to a disengaged position relative the striker 36, allowing the motor vehicle operator to raise the hood 12 without the motor vehicle operator having to insert a hand under the hood 12, but rather by simply pushing a push button 122 concealed as the logo situated on the front surface 124 of the motor vehicle 10.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "operably coupled" and "operably connected" generally mean that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle secondary hood latch release mechanism for a hood of a motor vehicle, comprising:
    a striker disposed on a forward lower surface of the hood;
    a pivotably mounted secondary hood latch comprising a locking hook adapted to engage the striker at a first distal end and a downwardly extending lever having a cam engaging surface at a second distal end, the secondary hood latch urged to a first position in engagement with the striker and having a second position disengaged from the striker; and
    a longitudinally actuated release push button assembly, the push button assembly comprising a push button having a forward position and a rearward position, a guide along which the push button moves between the forward position and the rearward position, and a longitudinally extending actuator operatively coupled with the push button, wherein the longitudinally extending actuator comprises an inclined cam surface that engages and displaces the cam engaging surface of the downwardly extending lever to actuate the secondary hood latch from the first position to the second position as the push button is moved from the forward position to the rearward position.

2. The motor vehicle secondary hood latch release mechanism of claim 1, wherein the locking hook at the first distal end is disposed to engage the striker when in the first position and the secondary hood latch is pivotally attached to the motor vehicle by a pivot about which the secondary hood latch pivots, and the downwardly extending lever of the secondary hood latch is disposed at an opposite second distal end of the secondary hood latch relative the pivot.

3. The motor vehicle secondary hood latch release mechanism of claim 2, wherein the downwardly extending lever is integrated with the secondary hood latch.

4. The motor vehicle secondary hood latch release mechanism of claim 1, wherein the longitudinally extending actuator of the push button assembly extends perpendicularly from a rear face of the push button and engages and displaces the downwardly extending lever of the secondary hood latch when the push button is moved rearwardly from the forward position to the rearward position to actuate the secondary hood latch.

5. The motor vehicle secondary hood latch release mechanism of claim 1, wherein the guide of the longitudinally actuated release push button assembly comprises a tubular member within which a first guide member is disposed on an interior surface thereof and the push button comprises a second guide member that engages the first guide member.

6. The motor vehicle secondary hood latch release mechanism of claim 5, wherein the first guide member comprises a longitudinally extending slot formed within the interior surface of the tubular member and the second guide member comprises an outwardly extending tab on a side of the push button that engages the longitudinally extending slot.

7. The motor vehicle secondary hood latch release mechanism of claim 5, wherein the first guide member comprises a longitudinally extending tab on a side of the interior surface of the tubular member and the second guide member comprises a notch disposed on a side of the push button that engages the longitudinally extending tab.

8. The motor vehicle secondary hood latch release mechanism of claim 1, wherein the push button is configured to incorporate a motor vehicle logo on a front surface of the motor vehicle.

9. The motor vehicle secondary hood latch release mechanism of claim 1, wherein the push button is disposed on a forward portion of the motor vehicle.

10. The motor vehicle secondary hood latch release mechanism of claim 9, wherein the push button is disposed on a grill assembly mounted to the forward portion of the motor vehicle.

11. The motor vehicle secondary hood latch release mechanism of claim 9, wherein the push button is disposed on a fascia assembly mounted to the forward portion of the motor vehicle.

12. The motor vehicle secondary hood latch release mechanism of claim 1 further comprising a resilient member urging the push button to the forward position.

13. The motor vehicle secondary hood latch release mechanism of claim 12, wherein the push button is disposed on a front surface of the motor vehicle and further comprises an exposed face having an outer perimeter; and
the guide of the longitudinally actuated release push button assembly comprises a tubular member within which a first guide member is disposed on an interior surface thereof, one or more stops is disposed on the interior surface thereof proximate a rear edge of the tubular member and a front edge of the tubular member, and the resilient member extends between the rear stop of the tubular member and a rear face of the push button opposite the exposed face, wherein the first guide member of the tubular member engages a second guide member disposed on the outer perimeter of the exposed face of the push button and the one or more stops proximate the rear and front edges of the tubular member engage the outer perimeter of the exposed face of the push button to restrain the exposed face of the push button within the tubular member.

14. A hood latch assembly for a motor vehicle for restraining a hood striker comprising a secondary hood latch, a displaceable push button disposed on a front surface of the motor vehicle and further comprising an exposed face having an outer perimeter, an actuator operatively coupled with the push button, a guide along which the push button is displaced, the guide having a rear stop and a front stop, and the guide comprising a tubular member within which a pair of first guide members is disposed on opposite sides on an inner surface thereof, the push button comprising a pair of second guide members on opposite sides thereof that each engage one of first guide member, and the actuator comprising an inclined cam surface that engages a downwardly extending lever having a cam engaging surface disposed at a distal end of the secondary hood latch to disengage the secondary hood latch from the hood striker as the push button is moved from a forward position to a rearward positions;
wherein the second guide members are disposed on the outer perimeter of the exposed face of the push button to engage the first guide members for movement of the push button between the first forward position and the second rearward position, the rear and front stops are disposed proximate a rear edge and a front edge of the tubular member, respectively, and the rear stop and the front stop of the tubular member engage the outer perimeter of the exposed face of the push button to restrain the exposed face of the push button within the tubular member.

15. The hood latch assembly of claim 14, wherein each of the first guide members comprise a longitudinally extending slot formed within the interior surface of the tubular member and each of the second guide members comprise an outwardly extending tab on a side of the push button that engages the longitudinally extending slot.

16. The hood latch assembly of claim 14, wherein each of the first guide members comprise a longitudinally extending tab on a side of the interior surface of the tubular member and each of the second guide members comprise a notch disposed on a side of the push button that engages the longitudinally extending tab.

17. The hood latch assembly of claim 14, wherein the secondary hood latch comprises a locking hook at an opposite distal end disposed to engage the hood striker when in a first position and a pivot by which the secondary hood latch is pivotally attached to a motor vehicle and about which the secondary hood latch pivots, and wherein the secondary hood latch further comprises a torsion spring mounted about the pivot so as to urge the secondary hood latch to the first position.

18. A motor vehicle secondary hood latch assembly for a hood of a motor vehicle, comprising:
a striker disposed on a forward lower surface of the hood;
a secondary hood latch, the secondary hood latch having a first position in engagement with the striker and a second position disengaged from the striker;
a longitudinally actuated release push button assembly, the push button assembly comprising a push button disposed on a front surface of the motor vehicle and further comprises an exposed face having an outer perimeter and having a forward position and a rearward position and a pair of tabs on opposite sides thereof, a guide along which the push button moves between the forward position and the rearward position comprising a tubular member within which a pair of longitudinally extending slots are formed within an inner surface of the tubular member that each engages one of the pair of tabs disposed on the outer perimeter of the push button, the guide further comprising a rear stop and a front stop disposed proximate a rear edge and front edge of the tubular member, respectively, beyond which the push button is prevented from traveling;
a longitudinally extending actuator operatively coupled with the push button, wherein the longitudinally extending actuator comprises an inclined cam surface that engages and displaces a downwardly extending lever having a cam engaging surface disposed at a distal end of the secondary hood latch from the first position to the second position as the push button is moved from the forward position to the rearward position; and
a resilient member urging the push button to the forward position;
wherein the resilient member extends between the rear stop of the tubular member and an interior face of the push button, and the rear stop and front stop of the tubular member engage the outer perimeter of the exposed face of the push button to restrain the exposed face of the push button within the tubular member.

19. The motor vehicle secondary hood latch release assembly of claim 18, wherein the secondary hood latch comprises a locking hook at an opposite distal end disposed to engage the striker when in a first position and a pivot by which secondary hood latch is pivotally attached to the motor vehicle and about which the secondary hood latch pivots, and wherein the resilient member comprises a torsion spring mounted about the pivot so as to urge the secondary hood latch to the first position.

20. The motor vehicle secondary hood latch release assembly of claim 18, wherein the downwardly extending lever is integrated with the secondary hood latch.

* * * * *